(12) United States Patent
Ullyott

(10) Patent No.: US 7,654,087 B2
(45) Date of Patent: Feb. 2, 2010

(54) COMPACT COMPOUND ENGINE PACKAGE

(75) Inventor: Richard Ullyott, St-Bruno (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 390 days.

(21) Appl. No.: 11/208,637

(22) Filed: Aug. 23, 2005

(65) Prior Publication Data

US 2007/0240427 A1    Oct. 18, 2007

Related U.S. Application Data

(63) Continuation of application No. PCT/CA2004/000259, filed on Feb. 24, 2004.

(51) Int. Cl.
*F02G 3/00* (2006.01)
*F02B 33/44* (2006.01)
*F16H 37/06* (2006.01)

(52) U.S. Cl. .................... 60/624; 60/607; 74/665 C

(58) Field of Classification Search .......... 60/39.182, 60/39.05, 716, 723, 801, 597, 605.1, 598, 60/607, 39.34, 39.35, 624; 418/13, 219; 123/241, 243; 74/665 C
See application file for complete search history.

(56) References Cited

U.S. PATENT DOCUMENTS

| 2,625,006 | A | * | 1/1953 | Lundquist ................ 60/607 |
| 2,933,892 | A | * | 4/1960 | Howard, Jr. ................ 60/791 |
| 3,204,406 | A | * | 9/1965 | Howes et al. ............. 60/39.17 |
| 3,788,266 | A | * | 1/1974 | Strang ........................ 440/75 |
| 3,809,020 | A | * | 5/1974 | Takitani ..................... 123/215 |
| 3,945,200 | A | | 3/1976 | Wright |
| 4,283,167 | A | | 8/1981 | Bassan et al. |
| 4,369,630 | A | | 1/1983 | Bloomfield |
| 4,569,645 | A | | 2/1986 | Asami et al. |
| 4,645,415 | A | | 2/1987 | Hovan et al. |
| 4,742,683 | A | | 5/1988 | Heminghous et al. |
| 4,782,658 | A | | 11/1988 | Perry |
| 4,815,282 | A | | 3/1989 | Wilkinson et al. |
| 4,914,904 | A | | 4/1990 | Parnes et al. |
| 5,002,019 | A | * | 3/1991 | Klaucke et al. .......... 123/41.49 |
| 5,056,315 | A | | 10/1991 | Jenkins |
| 5,072,705 | A | * | 12/1991 | Overman ................... 123/231 |
| 5,161,367 | A | | 11/1992 | Scalzo |
| 5,168,846 | A | * | 12/1992 | Paul et al. .................. 123/202 |

(Continued)

FOREIGN PATENT DOCUMENTS

GB    734359    7/1955

(Continued)

OTHER PUBLICATIONS

"Fluid Power Circuits and Controls: Fundamentals and Applications" Cundiff, John S., CRC Press, 2002.*

*Primary Examiner*—Michael Cuff
*Assistant Examiner*—Gerald L Sung
(74) *Attorney, Agent, or Firm*—Ogilvy Renault

(57) ABSTRACT

A compound cycle engine (10) comprises a compressor (19) and a turbine section (16 & 20), and at least one cycle topping device (12) cooperating with the turbine section (16 & 20) to provide power. The cycle topping device (12) has an output shaft (26) extending at an angle to the turbine shaft (28). Angled gearing (34) is provided for connecting the gas turbine shaft (28) and the cycle topping device (12).

18 Claims, 6 Drawing Sheets

U.S. PATENT DOCUMENTS

| | | |
|---|---|---|
| 5,178,514 A | 1/1993 | Damiral |
| 5,239,830 A | 8/1993 | Banthin et al. |
| 5,471,834 A * | 12/1995 | Kapich ......................... 60/269 |
| 5,540,199 A | 7/1996 | Penn |
| 5,692,372 A | 12/1997 | Whurr |
| 6,241,497 B1 | 6/2001 | Mallen |
| 6,247,301 B1 | 6/2001 | Brännström et al. |
| 6,637,202 B2 * | 10/2003 | Koch et al. .................... 60/602 |

FOREIGN PATENT DOCUMENTS

| | | |
|---|---|---|
| GB | 934403 | 8/1963 |
| GB | 2 020 739 A | 11/1979 |

* cited by examiner

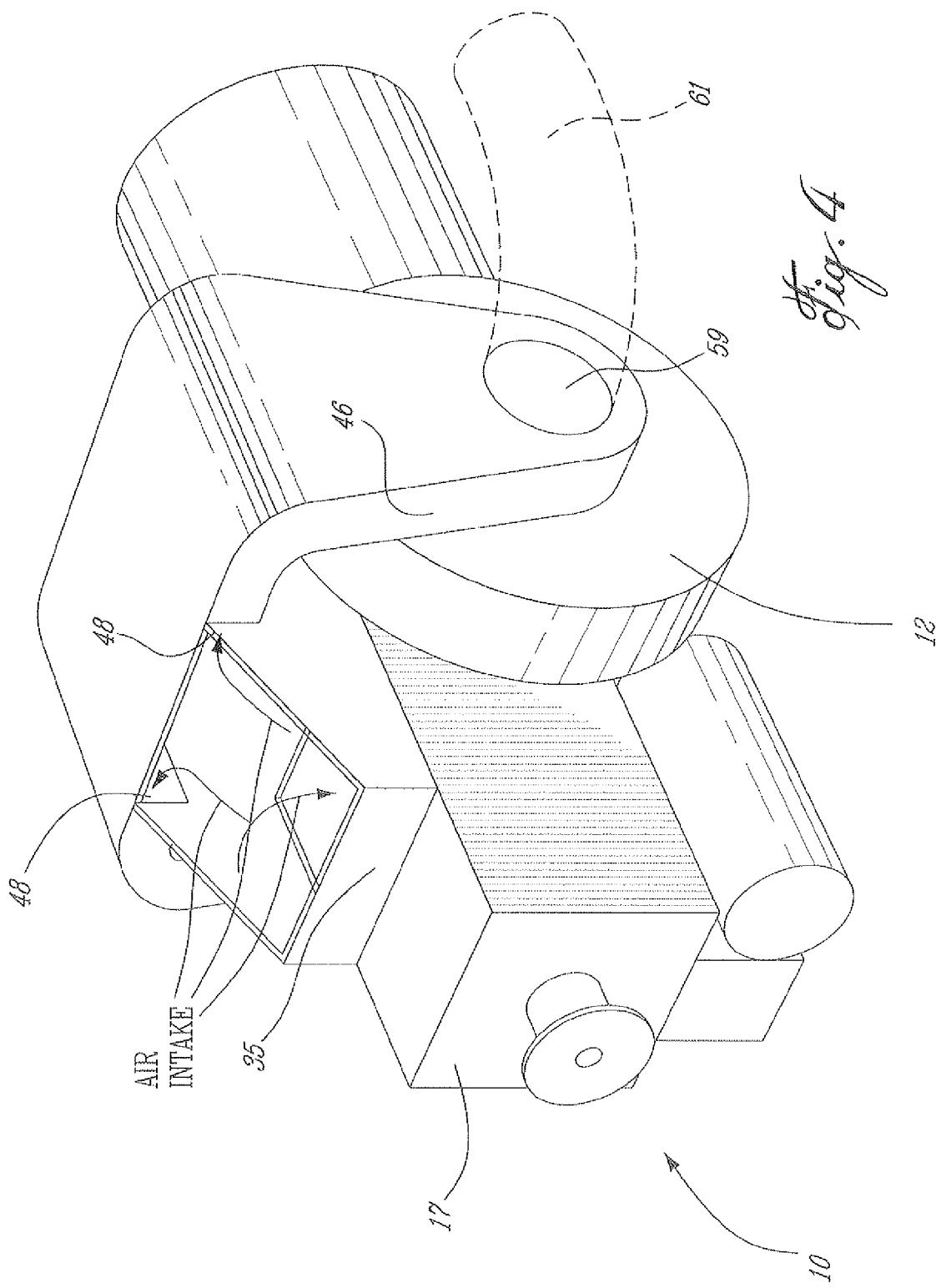

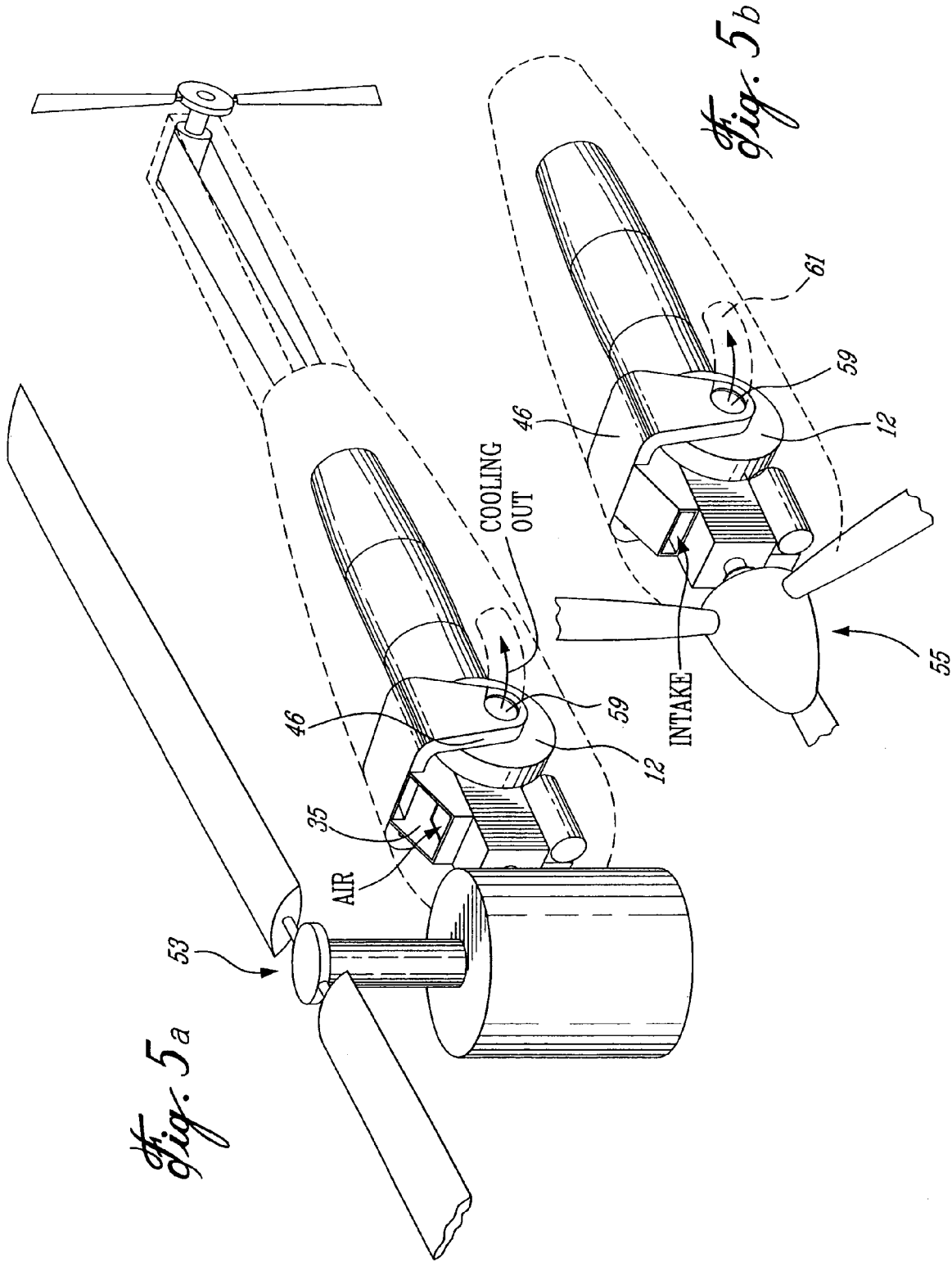

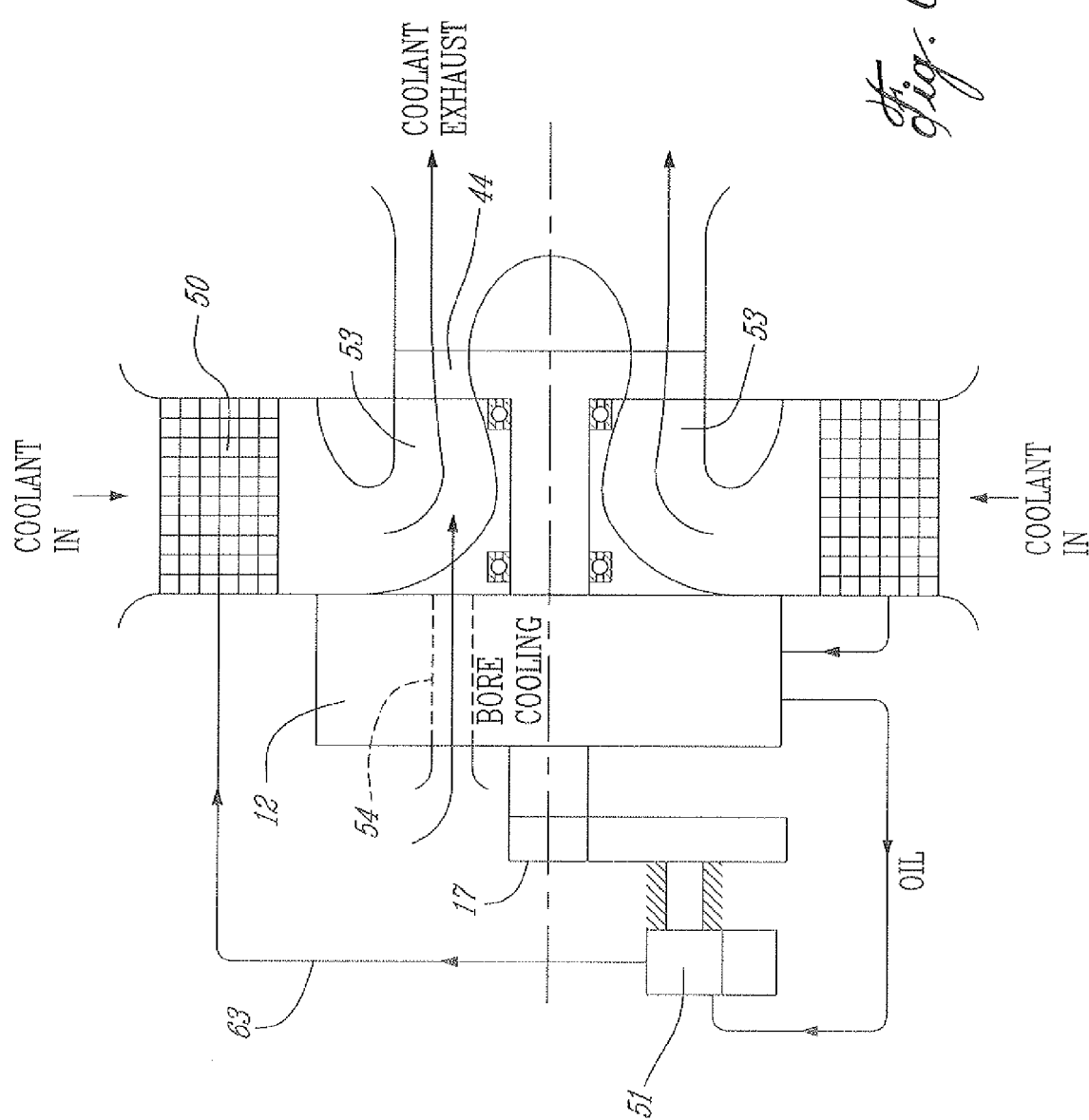

COMPACT COMPOUND ENGINE PACKAGE

RELATED APPLICATIONS(S)

This application is a continuation of International Patent Application No. PCT/CA2004/000259 filed on Feb. 24, 2004, which claims benefit of Canadian Patent Application Nos. 2,419,692 and 2,419,691 filed on Feb. 24, 2003, all of which are herein incorporated by reference.

BACKGROUND OF THE INVENTION

1. Field of the Invention

The present invention relates to compound cycle engines and, more particularly, to a compact compound engine package suitable for aircraft applications.

2. Description of the Prior Art

There have been attempts to developed compound cycle engines having internal combustion engines and turbine engines, coupled together to provide a common output. For example, see U.S. Pat. No. 4,815,282. However, to date, proposed compound cycle engine designs have been bulky and therefore failed to detail a complete solution to the integration of a cycle topping device, such as a rotary combustion engine, with a gas turbine in a compact packaging suitable for aero applications, such as aviation.

Moreover, prior art compound cycle engine designs have been weak in providing solutions to the cooling of internal combustion engines which are practical and realistically viable in an aircraft environment.

SUMMARY OF THE INVENTION

It is therefore an aim of the present invention to integrate a cycle topping device into a compact compound engine package.

It is also an aim of the present invention to provide a compact self cooling system for a rotary combustion device.

In one aspect, this disclosure covers the integration of a rotary topping device into a turbo-compounded package using a bevel drive to facilitate compact packaging particularly suitable for aircraft use. A few embodiments of the packaging are disclosed for different aircraft applications, including turboprop, turboshaft and auxiliary power unit (APU).

Therefore, in accordance with a general aspect of the present invention, there is provided a compound cycle engine comprising a compressor and a turbine section, said turbine section having a turbine shaft, and at least one cycle topping device providing an input to said turbine section and cooperating therewith to provide shaft horsepower, said at least one cycle topping device having an output shaft extending at an angle to said turbine shaft, and wherein a bevel gearbox mechanically links the turbine shaft and the cycle topping device output shaft together.

In accordance with a further general aspect of the present invention, there is provided an aircraft engine comprising a compressor section and a turbine section turbocompounded with at least one cycle topping device oriented at an angle with respect thereto, the turbine section having a turbine shaft mechanically linked to an output shaft of the cycle topping device through bevel gearing to provide a common output.

In accordance with a still further general aspect of the present invention, there is provided a compound cycle engine comprising a compressor and a turbine section, topping means for providing an energy input to said turbine section to permit operation thereof, said topping means being oriented at an angle to said turbine section, and bevel gearing for mechanically linking said topping means and said turbine section in order to provide a common output to drive a load.

In accordance with a still further general aspect of the present invention, there is provided a compound cycle engine comprising a compressor and a turbine section, at least one cycle topping device providing an input to said turbine section and cooperating therewith to provide shaft horsepower, said at least one cycle topping device being fed with pressurized air from said compressor section, and wherein a valve is provided for selectively bypassing said cycle topping device.

In accordance with a still further general aspect of the present invention, there is provided a compound cycle engine comprising a compressor and a turbine section, at least one cycle topping device providing an input to said turbine section and cooperating therewith to provide shaft horsepower, and gas turbine engine accessories, wherein said at least one cycle topping device drives said gas turbine engine accessories.

BRIEF DESCRIPTION OF THE DRAWINGS

Reference will now be made to the accompanying drawings, in which:

FIG. 4 is a conceptual isometric view of the engine of FIG. 3, showing the outer air cooling ducts in place;

FIGS. 5a and 5b shows the device of FIG. 4 in both turboshaft and turboprop installations; and FIG. 6 is a schematic cross-sectional side view of a rotary topping device with integrated toroidal cooler and cooling fan.

DESCRIPTION OF THE PREFERRED EMBODIMENTS

Figure 1:
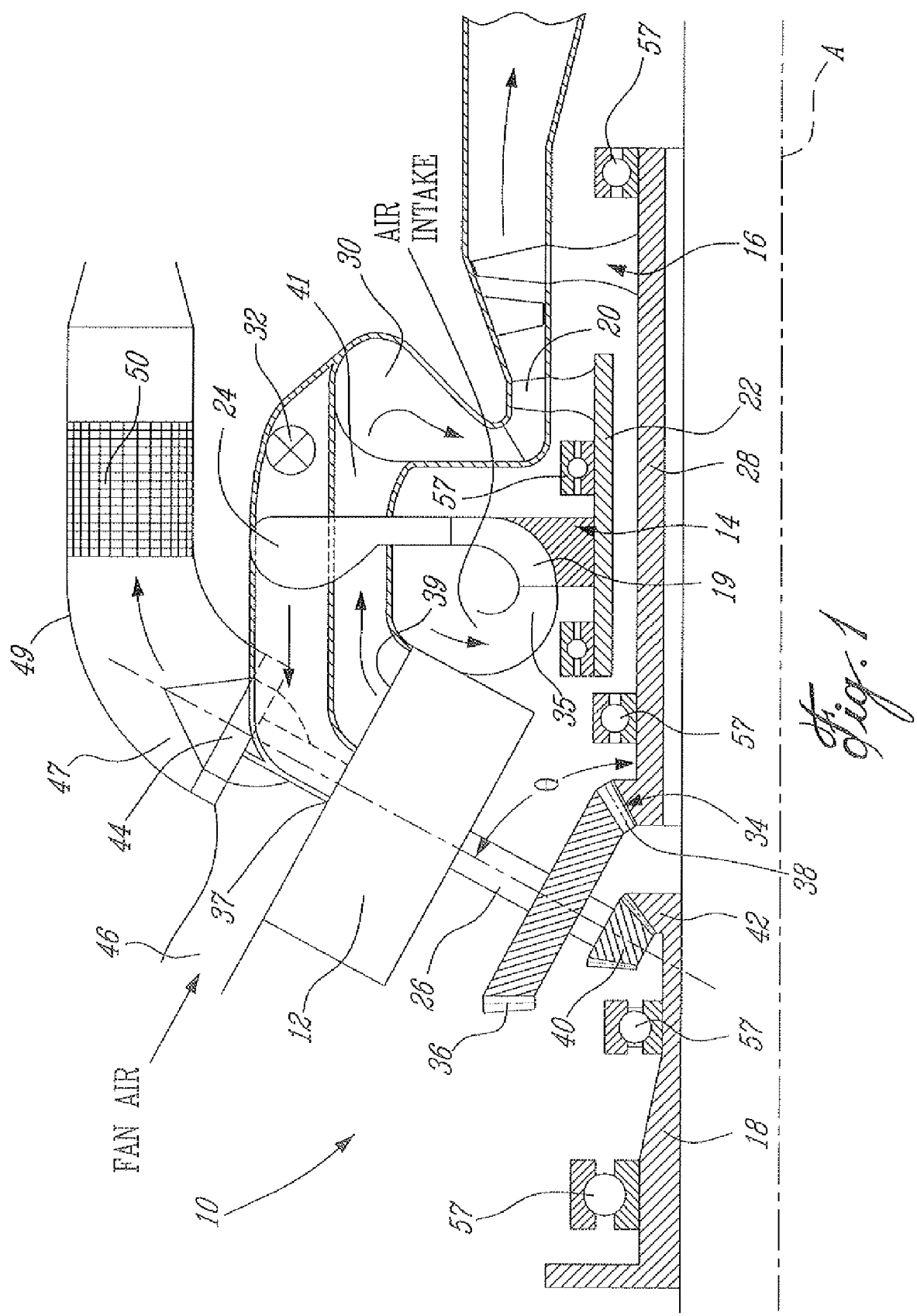
FIG. 1 is a schematic diagram showing the integration of the gas turbine engine and rotary machine using bevel drive and direct drive blower.
Figure 2:
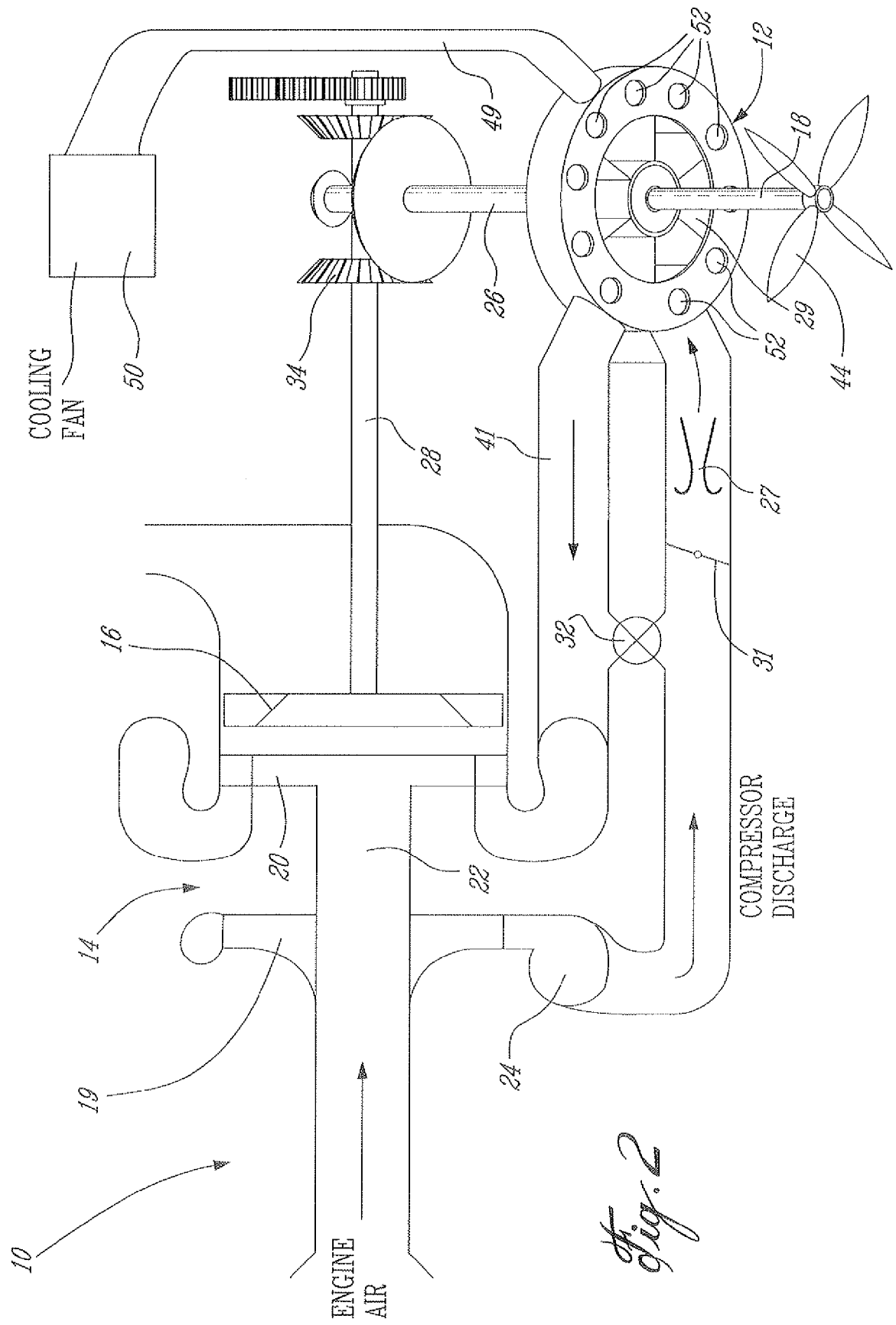
FIG. 2 is a functional schematic diagram of the compound cycle engine illustrating the air flow path through the gas turbine and the rotary topping device.

FIG. 1 is a schematic representation of a compound cycle engine 10 of a type preferably provided for use in a variety of aero applications, such as turboshaft, turboprop or APU (auxiliary power unit) applications. Referring to FIG. 1, it can be seen that the compound cycle engine 10 generally comprises at least one rotary cycle turbine topping device (TTD) 12 (preferably 1 or 2, as indicated in FIG. 1) and a gas turbine engine 14, which acts as a turbocharger. Turbocharger 14 comprises a compressor 19, a first stage turbine 20 and a second stage or power turbine 16. A hollow shaft 22 connects first stage turbine 20 to compressor 19. The power turbine 16 is preferably a free turbine and includes a power turbine shaft 28 concentrically disposed within the hollow shaft 22 for independent rotation with respect thereto about a main engine axis 4. The shaft 28 connects power turbine 16 to the rotary cycle topping device 12 via a bevel gearset 34. Preferably the bevel gear set 34 has a reduction gear ratio of 3:1. It is understood that the gear ratio could however be any desired gear ratio. Compressor 19 communicates with an air intake 35 and a compressor scroll 24, the compressor scroll 24 leading to an inlet 37 of the rotary cycle topping device 12. The compressor scroll 24 preferably consists of a split scroll (2*180 deg half scrolls), as indicated in FIG. 2. An air outlet 39 of the rotary cycle topping device 12 communicates with an exhaust duct 41 to a turbine volute 30 leading to the turbines 20 and 16. A wastegate 32 selectively connects compressor scroll 24 and turbine volute 30 in fluid flow communication. The wastegate 32 preferably includes a selectively openable blow-off valve. As best shown in FIG. 2, the waste gate or blow-off valve 32 selectively allows the compressor discharge to bypass the rotary cycle topping device 12 and to "blow off" directly into the turbine volute 30 in order to prevent surge at low rotary cycle topping device speed.

As shown in FIG. 1, the rotary cycle topping device 12 has an output shaft 26. To facilitate neat and compact packaging suitable for aircraft use, it is herein proposed to set the output shaft 26 of the rotary cycle topping device 12 at an angle θ of about 90 degrees, and preferably less, to the power turbine shaft 28. The angle θ is preferably 45 degrees or greater. The bevel gearset 34 is used to mechanically link the rotary topping device output shaft 26 and the power turbine output shaft 28 together. The use of the bevel gearset 34 advantageously provides for very short ducting from the compressor 19 to the rotary cycle topping device 12 and the rotary cycle topping device 12 to the compressor turbine 20 and the power turbine 16 while at the same time providing a compact transmission. The compressor exit and turbine entry ducting is hot, heavy and expensive and, thus, is preferably as short as possible. The length of the ducting should also be minimal in order to minimize heat and pressure losses which negatively affect the overall engine efficiency.

By so orienting the rotary cycle topping device 12 with respect to the power turbine shaft 28 and by using a bevel gearset, the envelope and frontal area of the engine 10 can also be minimized. This can be readily appreciated from FIG. 3 which shows a pair of rotary cycle topping devices 12 installed at the front of the engine 10 on opposed sides of a gearbox 17, the rotary cycle topping devices 12 being oriented at approximately 90 degrees to the main engine axis. The resulting package very much resembles commercially available turboprops and turboshaft gas turbine applications and can conceivably be installed in existing aircraft nacelles or engine bays.

Another advantage provided by the above compact packaging configuration is that cooling air can be drawn along the main cycle air from a single inlet 35 (FIG. 3) at the front of the engine 10.

While the rotary cycle topping device(s) could be placed in parallel with the compressor turbine rotor with a relatively short ducting to the compressor and turbine, a potentially heavy idler gear train would be needed. Also the resultant frontal area would be high and not so suitable for aero engine installation.

Inline placement of the rotary topping device(s) tends to lead to long ducts from either the turbine or compressor to the rotary topping device(s) as well as potentially requiring long installation. The above-described used of a bevel gearset to mechanically linked the power turbine shaft 28 to the output shaft 26 of the rotary cycle topping device 12 is, thus, advantageous as compared to the other contemplated alternatives.

More specifically, as shown in FIG. 1, the bevel gearset 34 generally comprises a first bevel gear 36 rigidly mounted to the rotary cycle topping device output shaft 26 for meshing engagement with a second bevel gear 38 provided at the front end of the power turbine shaft 28. A third gear 40 is rigidly mounted at the distal end of the rotary cycle topping device output shaft 26 for meshing engagement with a fourth bevel gear 42 provided on a shaft 18, which is connected to a load, such as a propeller (FIG. 5b), a generator, a tachometer, a helicopter rotor (FIG. 5a), a starter (FIG. 3), an oil pump (FIG. 3), a fuel pump (FIG. 3), a cooling fan, and a load compressor. Accordingly, the shaft 18 is directly drivingly connected to the rotary cycle topping device output shaft 26 and indirectly drivingly connected to the power turbine shaft 28 through the rotary topping device output shaft 26. The outputs of the rotary cycle topping device 12 and power turbine 16 are thus linked mechanically to drive the shaft 18. They both cooperate to provide the shaft horsepower required to drive the load coupled to the shaft 18. At engine start-up, the rotary cycle topping device 12 does most of the work, whereas under normal operating conditions, the power turbine 16 contributes significantly to the total power output on the shaft 18.

It is understood that the gearset 34 does not need to be a double gearset and that any gearset that permits coupling of two non-parallel shafts could be used as well. All shafts 18, 22, 26 and 28 have suitable bearings 57.

As shown in FIG. 1, rotary engine shaft 26 is also connected to a fan or blower 44 having a fan air inlet 46 and a fan air outlet 47 communicating via ducting 49 to an oil cooler 50.

The rotary cycle topping device 12 may be of any suitable design, such as those disclosed in U.S. Pat. Nos. 5,471,834, 5,522,356, 5,524,587 and 5,692,372, to name a few, though there are certainly others available as well, as will be understood by the skilled reader. The contents of all of these documents are hereby incorporated into this disclosure by reference. It is noted that the cycle topping device does not necessarily have to be an internal combustion engine, the only requirement being that it produces the input (i.e. hot stream of gas) needed for the turbines to operate. For instance, a wave rotor engine coupled to a combustor could potentially be used for topping or providing an energy input to the gas turbine cycle.

Figure 3:
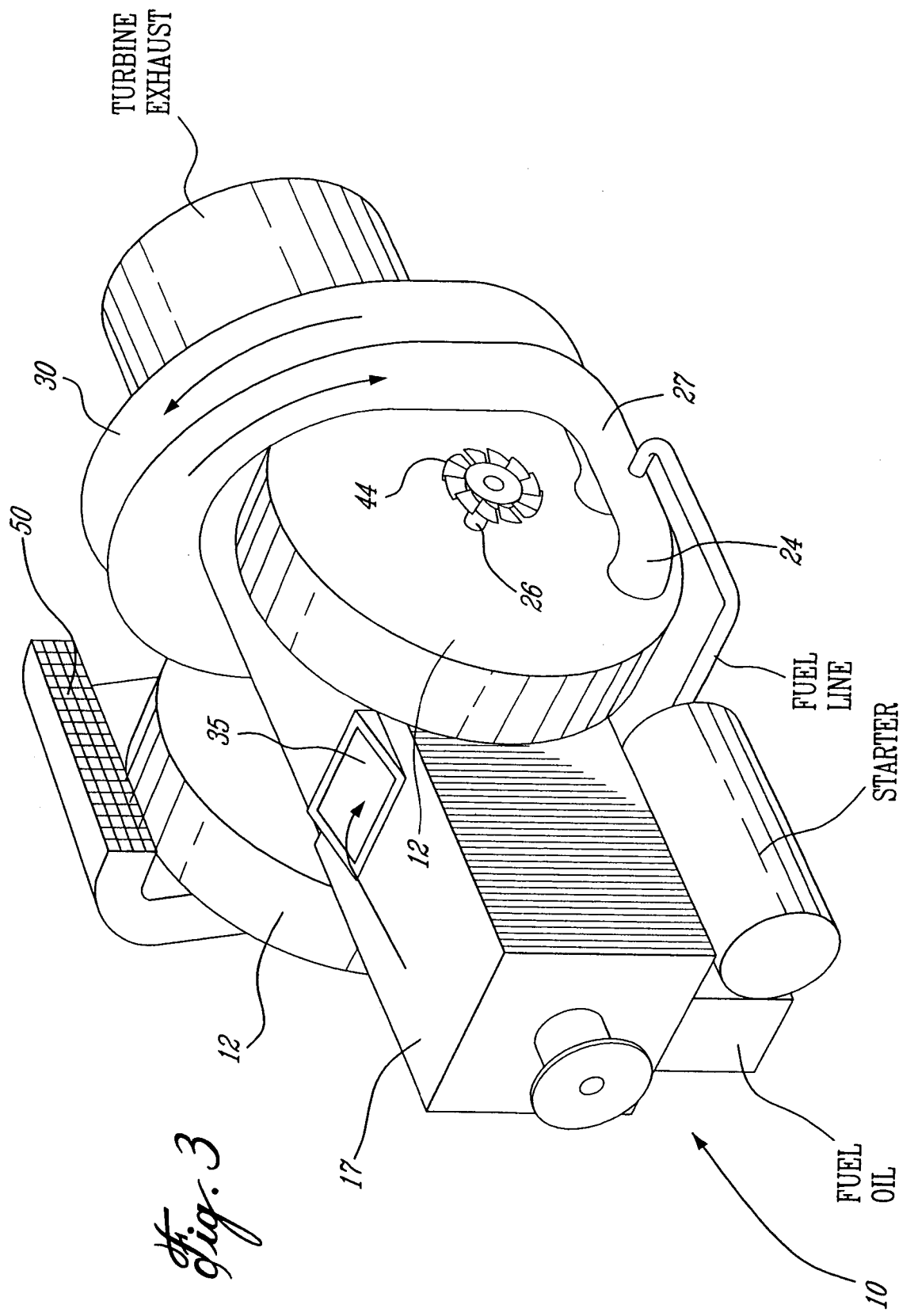
FIG. 3 is a conceptual isometric view of a turbo compound engine package.

As shown in FIG. 2, the rotary cycle topping device 12 preferably generates rotary movement through a sliding vane rotor 29 to drive the output shaft 26. A fuel-air mixer 27 is provided in the ducting between the compressor scroll 24 and the rotary cycle topping device inlet 37 to inject fuel in the compressed air before it flows into the rotary cycle topping device 12. A low speed enrichment throttling valve 31 is provided in the ducting just upstream of the fuel-air mixer 27 to adjust the quantity of air entering into the fuel and air mixture. It can be readily appreciated from FIG. 2, that the gas generator (i.e. the compressor 19 and the compressor turbine 20) does not drive any accessories, its main function being to turbocharge the rotary cycle topping device 12. It is the rotary cycle topping device 12 and the power turbine 16 that provides the require shaft horsepower to drive the accessories via a gearbox 17 (FIG. 3). The shaft 26 act as a power take-off shaft for driving the accessories. The term "accessories " is herein intended to generally refer to gas turbine components that need to be driven but which does not provides any propulsive forces. For instance, the accessories could take the form of a fuel pump, an oil pump, an air pump, a starter, a tachometer, a generator and a load compressor.

Referring now to FIGS. 5a and 5b, shown is the compound cycle engine 10 in turboshaft and turboprop installations, respectively. In FIG. 5a, the engine 10 is used to drive a helicopter rotor 53. In FIG. 5b, the engine drives a propeller 55. In the turboshaft application, the air intake is located at the top of the engine 10, whereas in the turboprop application, the air intake 35 is located on the front side of the engine 10.

In use, incoming air flowing through the air intake 35 is compressed by the compressor 19 and directed to the inlet 37 of the cycle topping device 12 via compressor scroll 24. Fuel is introduced into the compressed air flow immediately prior to its entry into the rotary cycle topping device 12 by known means as schematically depicted at 27 in FIG. 2. The low speed enrichment throttling valve 31 (FIG. 2) adjusts the quantity of air entering into the fuel and air mixture. The fuel/air mixture is then further compressed by the rotary motion of the rotor 29 before being ignited. The resultant combustion gases are then expanded to drive the rotor 29 and, thus, the shaft 26, before being exhausted. The combustion gases are directed into the compressor turbine 20 and the power turbine 16 via the turbine volute 30. The compressor turbine 20 and the power turbine 16 extract energy from the expanding combustion gases, converting the energy into shaft horsepower to respectively drive the compressor 19 and the shaft 18 as well as other accessories. In use, shaft 22 typically rotates at about 60000-70,000 rpm while shaft 28 rotates at about 50,000 rpm. The bevel gearset 34 will provide a reduction of about 3:1. While output bevel gearset 34 will provide an output shaft speed as required, such as 6,000 rpm for a turboshaft or 2,000 rpm for a turboprop. The rotary cycle topping device will have a rotational speed of about 15,000 rpm. The above speeds are given for exemplary purposes only and are thus not intended to be exclusive.

In operation, the blow-off valves 32 are typically opened where there is a mismatch between the flow capacitors of the rotary cycle topping device 12 and the turbocharger 14 such as might occur at part speed operating conditions.

The above-described combined cycle engine offers high thermal efficiency because of high cycle pressure ratio and temperature provided by the closed volume combustion of the rotary cycle topping device 12. The combined cycle also provides for the reduction of the size and the weight of the turbomachinery as compared to a conventional single cycle gas turbine engine at the same horsepower shaft or thrust because of the increased power per unit mass airflow.

Furthermore, the integration of a rotary combustion device (i.e. the preferred embodiment of the cycle topping device 12) into a gas turbine engine is significantly advantageous in term of fuel efficiency particularly when operating at reduced power.

The rotary combustion cycle topping device(s) 12 generate(s) heat during operation which must be dissipated in order to prevent overheating thereof. Cooling requirements of such rotary internal combustion engines can be higher than gas turbine engines and therefore achieving very compact arrangements for cooling are important to making a practical device for aviation and automotive applications.

As shown in FIGS. 1 and 6, a compact self cooling system for the rotary cycle topping device 12 can be achieved by integrating the axial blower or cooling fan 44 directly on the output shaft 26 of the rotary cycle topping device 12. This is made advantageous by the relatively high output rpm of the rotary cycle topping device 12 (about 16000 rpm) which makes a high flow compact fan practical. There is no need for intermediate gears, chains or pulleys for driving the fan 44, as the fan 44 is directly mounted on the rotary topping device output shaft 26, thereby providing for a very compact cooling arrangement.

As shown in FIG. 4, the direct drive cooling fan 44 draws ambient air through air cooling ducts 46 via cooling air intakes 48. The cooling air intakes 48 are located at the front of the engine 10 at a higher elevation or outboard position than the engine air intake 35 and laterally with respect thereto. The compressor intake 35 corresponds to the lowest flow section. This advantageously provides for more direct flows of cooling air, which are much more difficult to design for. The ducting 46 to the fan 44 can advantageously be very short from the air intakes 48 due to the 90 degrees rotary topping device placement. The cooling air is exhausted laterally through an exhaust port 59 of each side of the engine 10. An optional duct aft 61 can be connected to the exhaust port 59 to discharge the cooling air axially along the sides of the engine 10.

The air cooling ducts 46 channel the air through a heat exchanger or an oil cooler 50 (FIGS. 1, 2, 3 and 6) to pick up the excess heat absorbed by oil or other coolant as it is circulated by a pump 51 (FIG. 6) through cooling passages 52 defined in the rotary topping device casing, as shown in FIG. 2. As shown in FIG. 6, the pump 51 is mounted in a closed loop circuit 63 with the device 12 and the oil cooler 50 to ensure a continuous re-circulation flow of oil. As the oil travels through the oil cooler 50, it gives off heat to the forced air passing through the oil cooler 50. Then, the so cooled oil is re-circulated through the cooling passages 52 in the rotary topping device casing to extract excess heat therefrom. The oil cooling is about 5% of the fuel input.

As shown in FIG. 6, the oil cooler 50 is preferably provided in one embodiment in the form of a toroidal oil cooler surrounding the fan inlet on a downstream side of the rotary topping device 12. The toroidal oil cooler 50 is integrated to the rotary topping device 12 and extends rearwardly therefrom. The toroidal cooler 50 is concentrically mounted about the output shaft 26 and located radially outwardly of the device 12. The toroidal oil cooler 50 provides a toroidal cooling path for the oil circulated by the pump 51, which is conveniently driven from the reduction gearbox 17. The fan 44 draws air radially inwardly through the toroidal oil cooler 50. The toroidal cooler 50 defines air exhaust passages 53 defining a bend from radial to axial. The hot air leaving the toroidal cooler 50 is rejected axially rearwardly of the fan 44. As illustrated in FIG. 6, the fan 44 is used mainly for the purpose of providing forced air through the oil cooler 50 in order to improve cooling efficiency. However, suction air from the fan inlet or delivery air may also be used to cool the core of the rotary topping device 12 by causing air to flow through axially extending passages 54 defined through the rotary topping device 12.

The embodiments of the invention described above are intended to be exemplary. Those skilled in the art will therefore appreciate that the forgoing description is illustrative only, and that various alternatives and modifications can be devised without departing from the spirit of the present invention. For example, the compressor and turbine configuration shown is only one of many possibilities. The ducting arrangement between successive components need not be exactly as shown, nor does the relative arrangement of components. Though the description refers generally refers to one rotary machine, it will be understood that one or more could be used in parallel or series. Accordingly, the present is intended to embrace all such alternatives, modifications and variances which fall within the scope of the appended claims.

The invention claimed is:

1. A compound cycle engine comprising a gas turbine engine including an engine casing housing a compressor and a turbine section mounted for rotation about a central axis, said turbine section having a turbine shaft coaxial to the central axis located between a front of the engine casing and a rear turbine exhaust plane, the engine casing having top, bottom and lateral side extending axially between the front of the engine casing and the exhaust plane, and at least one rotary cycle topping device providing an input to said turbine section and cooperating therewith to provide shaft horsepower, the at least one rotary cycle topping device being located on one of the lateral sides of the engine casing between the front face and are rear face of the engine casing, said at least one rotary cycle topping device having an output shaft located between the top and bottom side of the engine casing at an angle comprised between about 45 degrees to about 90 degrees to the turbine shaft, and wherein a bevel gearbox mounted to the engine casing mechanically links the turbine shaft and the output shaft of the at least one rotary cycle topping device together wherein said bevel gearbox includes first and second bevel gears respectively rigidly mounted to said rotary cycle topping device output shaft and said turbine shaft, and wherein a third bevel gear is mounted to said output shaft for meshing engagement with a fourth bevel gear associated to a load to be driven.

2. A compound cycle engine as defined in claim 1, wherein said output shaft extends at 90 degrees to said turbine shaft.

3. A compound cycle engine as defined in claim 1, wherein two rotary cycle topping devices are disposed at the front of the engine casing on opposed sides of the bevel gearbox and oriented at about 90 degrees with respect to the turbine shaft.

4. A compound cycle engine as defined in claim 3, wherein a frontal air intake is defined between said two rotary cycle topping devices, said frontal air intake being provided at the top side of the engine casing and including a cooling air inlet and an engine air inlet, the cooling air inlet being located at a higher elevation than the engine air inlet.

5. A compound cycle engine as defined in claim 1, wherein said turbine section includes a free turbine, and wherein said at least one rotary cycle topping device includes a rotary combustion engine fed with compressed air from said compressor section.

6. A compound cycle engine as defined in claim 5, wherein said rotary combustion engine is a sliding vane internal combustion engine.

7. A compound cycle engine as defined in claim 1, wherein said at least one rotary cycle topping device is fed with pressurized air from said compressor section, and wherein valve means is provided for selectively bypassing said at least one rotary cycle topping device.

8. A compound cycle engine as defined in claim 1, wherein said turbine shaft and said output shaft of the at least one rotary cycle topping device commonly drive a load selected from a group consisting of at least one of a propeller, a generator a helicopter rotor, a starter, an oil pump, a fuel pump, a cooling fan, and a load compressor.

9. A compound cycle engine as defined in claim 1, wherein the at least one rotary cycle topping device comprises a rotary combustion engine, and wherein a cooling airflow device is integrated to said output shaft.

10. A compound cycle engine as defined in claim 9, wherein said rotary combustion engine has a casing, said casing defining a plurality of passages through which a coolant is circulated to pick up excess heat from the rotary combustion engine, and wherein a cooling fan forces air through a heat exchanger to extract heat from the coolant as it flows through the heat exchanger.

11. A compound cycle engine as defined in claim 10, wherein said heat exchanger has a toroidal shape and surrounds the cooling fan inlet.

12. An aircraft engine comprising a gas turbine engine having a casing housing a compressor section and a turbine section mounted for rotation about a central axis located between a front of the casing and a rear turbine exhaust plane, the casing having top, bottom and lateral sides extending axially between the front of the casing and the exhaust plane, the compressor and turbine sections being turbocompounded with a pair of cycle topping devices disposed on lateral sides of the casing between the front of the casing and the exhaust plane thereof, the turbine section having a turbine shaft coaxial to said central axis and mechanically linked to respective output shafts of the rotary cycle topping devices through bevel gearing to provide a common output, the output shafts located between the top and bottom sides of the casing of the turbine engine at an angle tote turbine shaft comprised between about 45 degrees to about 90 degrees wherein said bevel gearing includes first and second bevel gears respectively rigidly mounted to said rotary cycle topping device output shafts and said turbine shaft, and wherein a third bevel gear is mounted to said output shaft for meshing engagement with a fourth bevel gear associated to a load to be driven.

13. An aircraft engine as defined in claim 12, wherein said rotary cycle topping devices are mounted on opposed sides of said turbine shaft.

14. An aircraft engine as defined in claim 12, wherein the output shafts are oriented at an angle of about 90 degrees to said turbine shaft.

15. An aircraft engine as defined in claim 12, wherein said turbine section includes a free turbine, and wherein each of said rotary cycle topping devices includes a rotary combustion engine turbocharged with pressurized air from said compressor section.

16. An aircraft engine as defined in claim 15, wherein each of said rotary combustion engines includes a sliding vane internal combustion engine.

17. An aircraft engine as defined in claim 12, wherein said rotary cycle topping devices are fed with pressurized air from said compressor section, and wherein valve means is provided for selectively bypassing said rotary cycle topping devices.

18. An aircraft engine as defined in claim 12, wherein said turbine shaft and said output shafts of the rotary cycle topping devices commonly drive a load selected from a group consisting of a propeller, a generator a helicopter rotor, a starter, an oil pump, a fuel pump, a cooling fan, and a load compressor.

\* \* \* \* \*